(12) United States Patent
Chae et al.

(10) Patent No.: US 12,339,702 B2
(45) Date of Patent: Jun. 24, 2025

(54) DISPLAY DEVICE

(71) Applicant: LG ELECTRONICS INC., Seoul (KR)

(72) Inventors: Hyeongseok Chae, Seoul (KR); Hoeyoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 5 days.

(21) Appl. No.: 18/550,193

(22) PCT Filed: Mar. 15, 2021

(86) PCT No.: PCT/KR2021/003164
§ 371 (c)(1),
(2) Date: Sep. 12, 2023

(87) PCT Pub. No.: WO2022/196838
PCT Pub. Date: Sep. 22, 2022

(65) Prior Publication Data
US 2024/0160243 A1  May 16, 2024

(51) Int. Cl.
*G06F 1/16* (2006.01)
(52) U.S. Cl.
CPC .................. *G06F 1/1601* (2013.01)
(58) Field of Classification Search
CPC ............. G06F 1/1601; G02F 1/133314; G02F 2201/503; G02F 2201/465; G02F 1/133311
See application file for complete search history.

(56) References Cited

U.S. PATENT DOCUMENTS

| | | | |
|---|---|---|---|
| 7,944,521 B2* | 5/2011 | Ichioka | G02F 1/133308 349/122 |
| 9,401,315 B1* | 7/2016 | Bodenweber | H01L 23/373 |
| 9,635,787 B2* | 4/2017 | Yun | H05K 5/03 |
| 10,838,452 B2* | 11/2020 | Siddiqui | B32B 7/12 |
| 11,412,322 B2* | 8/2022 | Lee | H04R 5/02 |
| 2012/0033171 A1 | 2/2012 | Tannas, Jr. | |

FOREIGN PATENT DOCUMENTS

| | | | | |
|---|---|---|---|---|
| KR | 20100121165 A | * | 11/2010 | ........... G06F 1/1624 |
| KR | 10-2012-0124564 | | 11/2012 | |
| KR | 10-2016-0117026 | | 10/2016 | |
| KR | 10-2018-0001949 | | 1/2018 | |
| KR | 10-2019-0013680 | | 2/2019 | |
| KR | 20190013680 A | * | 2/2019 | ........... G02F 1/1336 |
| KR | 20190068032 A | * | 6/2019 | |

OTHER PUBLICATIONS

PCT International Application No. PCT/KR2021/003164, International Search Report dated Nov. 10, 2021, 4 pages.

* cited by examiner

*Primary Examiner* — Rockshana D Chowdhury
*Assistant Examiner* — Martin Antonio Asmat Uceda
(74) *Attorney, Agent, or Firm* — LEE, HONG, DEGERMAN, KANG & WAIMEY (57) ABSTRACT

A display device is disclosed. The display device according to the present disclosure comprises: a display panel; a frame located at the rear of the display panel; a plate coupled to the frame at the rear of the frame; and a back cover for covering the rear of the plate, wherein the plate comprises a damper arranged between the plate and the back cover and extended or contracted in the anteroposterior direction.

14 Claims, 13 Drawing Sheets

DISPLAY DEVICE

CROSS-REFERENCE TO RELATED APPLICATION(S)

This application is the National Stage filing under 35 U.S.C. 371 of International Application No. PCT/KR2021/003164, filed on Mar. 15, 2021, the contents of which is hereby incorporated by reference herein in its entirety.

TECHNICAL FIELD

The present disclosure relates to a display device.

BACKGROUND ART

With the development of information society, there has been a growing demand for various types of display devices. In order to meet such demand, various display devices, such as a liquid crystal display (LCD), a plasma display panel (PDP), an electro luminescent display (ELD), a vacuum fluorescent display (VFD), an organic light emitting diode (OLED), and the like, have been developed and used.

Among them, an LCD panel includes a TFT substrate and a color substrate that face each other with a liquid crystal layer interposed therebetween, and may display an image using light provided from a backlight unit. In addition, an OLED panel may display an image by depositing an organic material layer capable of emitting light by itself on a substrate on which a transparent electrode is formed. In particular, since a display device having an OLED panel does not require a backlight unit, there is an advantage of being implemented as an ultra-thin profile display device.

Meanwhile, inflight entertainment (IFE) displays installed at each seat of an airplane can provide various images to passengers on board the aircraft. In order to meet strict safety requirements of the aviation industry, a lot of research is being conducted to seek ways to minimize damage or breakage to IFE displays caused by external impact.

DISCLOSURE

Technical Problem

It is an objective of the present disclosure to solve the above and other problems.

It is another objective of the present disclosure to provide a display device capable of mitigating or absorbing external impact.

It is yet another objective of the present disclosure to provide a structure capable of achieving the rigidity of a display device.

It is yet another objective of the present disclosure to provide a structure capable of minimizing damage to a display panel when disassembling the display panel.

It is yet another objective of the present disclosure to provide a display device in which a carrier assembly having an antenna installed thereon and an optical assembly configured to provide light to icons on a front surface of a display panel are integrated into one.

Technical Solution

According to one aspect of the subject matter described in this application, there is provided a display device including: a display panel; a frame located rearward relative to the display panel; a plate coupled to the frame at a rear of the frame; and a back cover to cover a rear of the plate, wherein the plate includes a damper that is disposed between the plate and the back cover and is configured to be stretched or compressed in a front-and-rear direction.

According to another aspect, there is provided a display device including: a display panel; a frame located rearward relative to the display panel; and a coupling part disposed between the display panel and the frame, wherein the coupling part is fixed to the frame and is detachably coupled to the frame.

According to another aspect, there is provided a display device including: a transparent panel; a display panel coupled to a rear surface of the transparent panel so as to cover a portion of the transparent panel; a frame coupled to the display panel at a rear of the display panel; and an antenna assembly that is located rearward relative to the frame and is adjacent to one side of the frame, wherein the antenna assembly includes: a carrier assembly on which an antenna is installed and provided with a lens facing the display panel; and an optical assembly that is coupled to the carrier assembly at a rear of the carrier assembly and is configured to provide light to the lens.

Advantageous Effects

A display device according to the present disclosure has the following effects.

According to at least one of the embodiments of the present disclosure, it is possible to provide a display device capable of mitigating or absorbing external impact.

According to at least one of the embodiments of the present disclosure, it is possible to provide a structure capable of achieving the rigidity of a display device.

According to at least one of the embodiments of the present disclosure, it is possible to provide a structure capable of minimizing damage to a display panel when disassembling the display panel.

According to at least one of the embodiments of the present disclosure, it is possible to provide a display device in which a carrier assembly having an antenna installed thereon and an optical assembly configured to provide light to icons on a front surface of a display panel are integrated into one.

Further scope of applicability of the present disclosure will become apparent from the following detailed description. However, it should be understood that the detailed description and specific embodiments such as preferred embodiments of the present disclosure are given by way of example only, since various changes and modifications within the idea and scope of the present disclosure may be clearly understood by those skilled in the art.

MODE FOR THE INVENTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the present application, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

The directions "up (U)", "down (D)", "left (Le)", "right (Ri)", "front (F)", and "rear (R)" shown in the drawings are provided only for convenience of description, and the technical concept disclosed in the specification is not limited by these directions.

Figure 1:
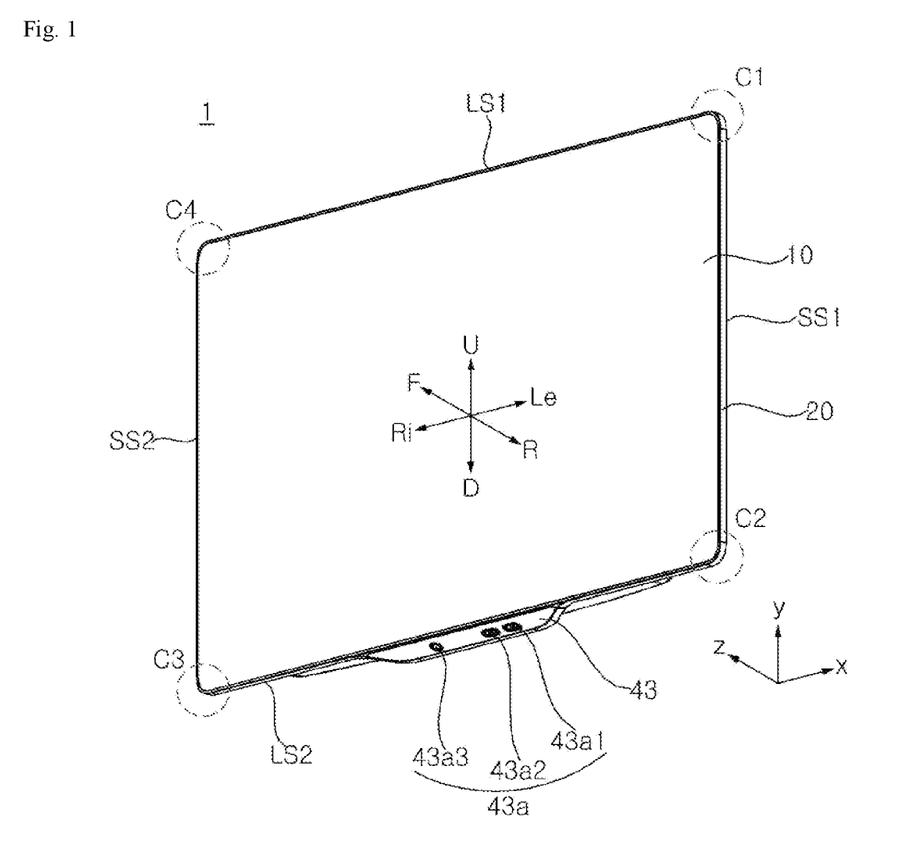
FIGS. 1 to 13 illustrate examples of a display device according to embodiments of the present disclosure.

Referring to FIG. 1, a display device 1 may include a first long side LS1, a second long side LS2 opposite the first long side LS1, a first short side SS1 adjacent to the first long side LS1 and the second long side LS2, and a second short side SS2 opposite the first short side SS1. For convenience of explanation, it is illustrated and described that lengths of the first and second long sides LS1 and LS2 are greater than lengths of the first and second short sides SS1 and SS2, but the lengths of the first and second long sides LS1 and LS2 may be substantially equal to the lengths of the first and second short sides SS1 and SS2.

A direction parallel to the long sides LS1 and LS2 of the display device 1 may be referred to as a first direction or a left-and-right direction LR. A direction parallel to the short sides SS1 and SS2 may be referred to as a second direction or an up-and-down direction UD. A direction perpendicular to the long sides LS1 and LS2 and the short sides SS1 and SS2 of the display device 1 may be referred to as a third direction or a front-and-rear direction FR. Here, a direction in which a display unit 10 displays a screen may be referred to as a front, and a direction opposite to the front may be referred to as a rear.

The first long side LS1 may be referred to as an upper side or an upper surface. The second long side LS2 may be referred to as a lower side or a lower surface. The first short side SS1 may be referred to as a left side or a left surface. The second short side SS2 may be referred to as a right side or a right surface.

The first long side LS1, the second long side LS2, the first short side SS1, and the second short side SS2 may be referred to as edges of the display device 1. In addition, points where the first long side LS1, the second long side LS2, the first short side SS1, and the second short side SS2 meet each other may be referred to as corners.

For example, a point where the first long side LS1 and the first short side SS1 meet may be referred to as a first corner C1; a point where the first short side SS1 and the second long side LS2 meet may be referred to as a second corner C2; a point where the second long side LS2 and the second short side SS2 meet may be referred to as a third corner C3; and a point where the second short side SS2 and the first long side LS1 meet may be referred to as a fourth corner C4.

Figure 2:
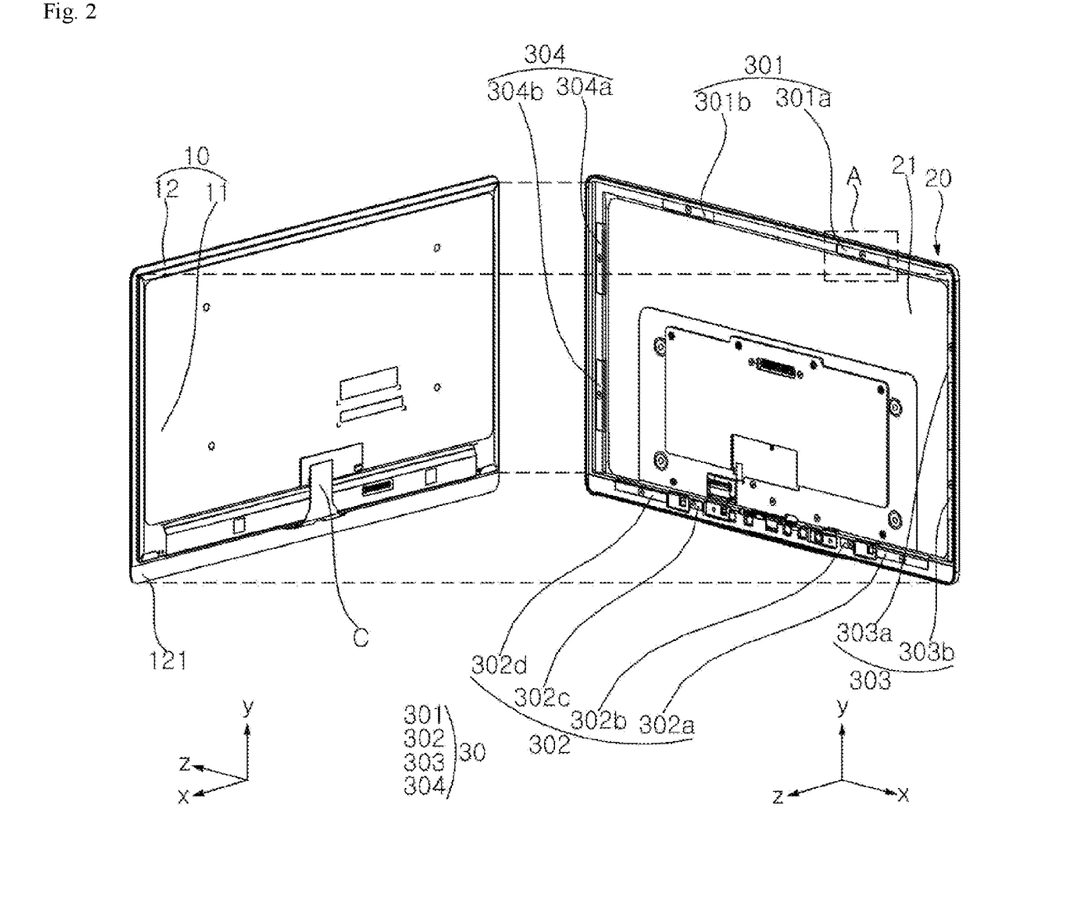

Referring to FIGS. 1 and 2, the display device 1 may include a display unit 10 and a frame 20. The display unit 10 may include a display panel 11 and a transparent panel 12.

The display panel 11 may display an image. The display panel 11 may be divided into an active area in which an image is displayed and a de-active area in which no image is displayed. For example, the display panel 11 may be an LCD panel. As another example, the display panel 11 may be an OLED panel. Meanwhile, a touch panel 11a (see FIG. 4) may be provided at the front of the display panel 11.

The transparent panel 12 may be disposed forward relative to the display panel 11, and may be coupled to the display panel 11. The transparent panel 12 may define a front surface of the display device 1. For example, the transparent panel 12 may be made of transparent glass or polycarbonate. Accordingly, the image of the display panel 11 may be displayed to the outside through the transparent panel 12. Meanwhile, the transparent panel 12 may be referred to as a protection panel or a window.

For example, the area of the transparent panel 12 may be greater than the area of the display panel 11. Here, a rear surface of the transparent panel 12 may be mostly covered by the display panel 11, but there may be a portion that is not covered by the display panel 11 (see reference numeral 121).

The frame 20 may be disposed rearward relative to the display panel 11, and may be coupled to the display panel 11. A portion of the frame 20 may cover the side of the display unit 10, and the remaining portion of the frame 20 may cover the rear of the display unit 10. For example, the frame 20 may include a metal material such as aluminum (Al). Thus, torsional rigidity and/or bending rigidity of the display device 1 may be increased. Meanwhile, the frame may be referred to as a main frame, a display cover, or a module cover.

Figure 3:
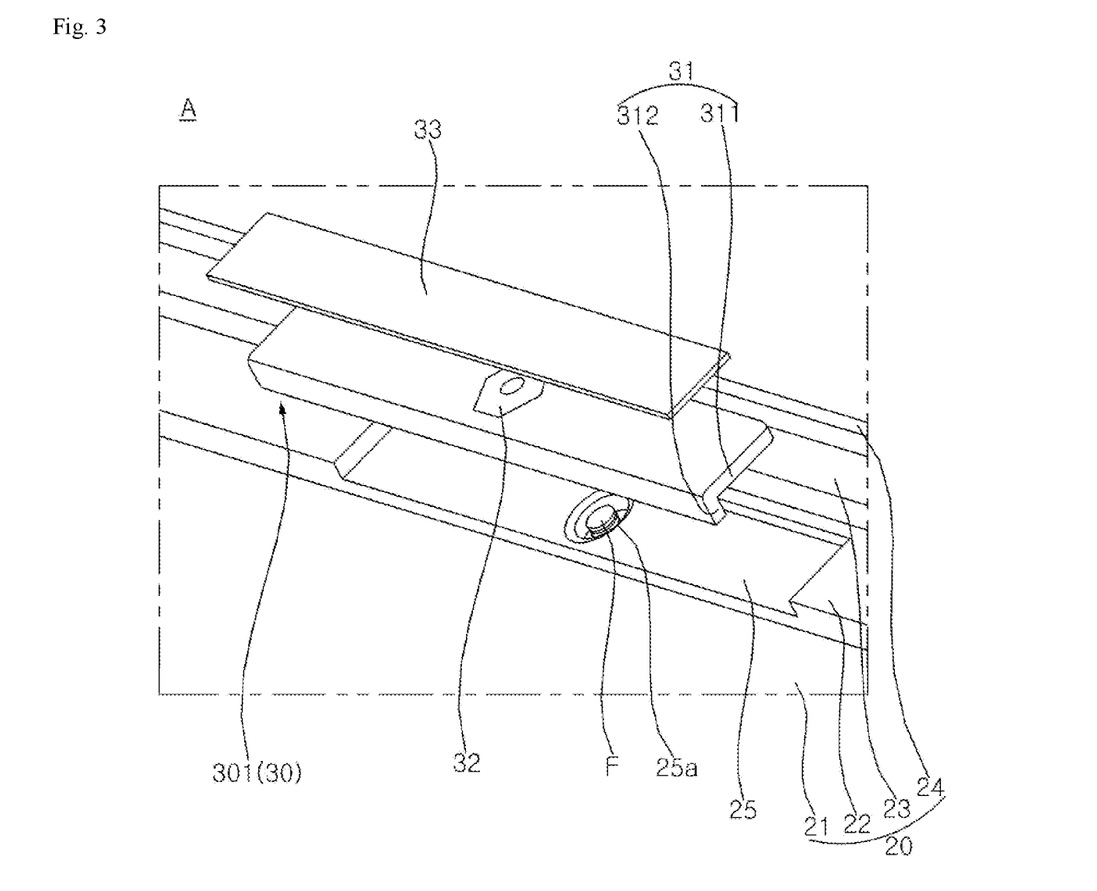

Referring to FIGS. 2 and 3, a coupling part 30 may be disposed between the display unit 10 and the frame 20, and may be coupled to the display unit 10 and the frame 20. For example, the coupling part 30 may include a plurality of coupling parts 301, 302, 303, and 304 spaced apart from each other along an edge of the frame 20.

A first coupling part 301 may be adjacent to an upper side of the frame 20, and a second coupling part 302 may be adjacent to a lower side of the frame 20. A third coupling part 303 may be adjacent to a left side of the frame 20, and a fourth coupling part 304 may be adjacent to a right side of the frame 20. The plurality of coupling parts 301, 302, 303, and 304 include an adhesive member such as double-sided tape, which will be described in detail later.

The frame 20 may include a body 21 and parts 22, 23, and 24. For example, the body 21 and the parts 22, 23, and 24 may be integrally formed as one body.

The body 21 may be disposed rearward relative to the display panel 11, and may be formed flat. The parts 22, 23, and 24 may extend along an edge of body 21.

A first part 22 may protrude in a direction from the body 21 toward the display panel 11, namely, forward. A second part 23 may protrude in a direction from the first part 22 toward the transparent panel 12, namely, forward. A third part 24 may protrude forward from the second part 23. The first part 22, the second part 23, and the third part 24 may be sequentially disposed from the body 21 toward the outside, and may have a step difference therebetween. For example, the width of the first part 22 may be greater than the width of the second part 23, and the width of the second part 23 may be greater than the width of the third part 24. Meanwhile, the second part 23 may cover the side of the display panel 11. The third part 24 may cover the side of the transparent panel 12.

A recessed portion 25 may be recessed rearward from the first part 22. In this case, the recessed portion 25 may form a step difference with respect to a portion excluding the recessed portion 25 of the first part 22. In other words, a step of the recessed portion 25 with respect to the body 21 may be less than a step of the portion excluding the recessed portion 25 with respect to the body 21. A hole 25a may be formed through the recessed portion 25 in the front-and-rear direction.

The coupling part 30 may be located forward relative to the recessed portion 25, and may be detachably coupled to the recessed portion 25. The coupling part 30 may include a block 31, a fixing portion 32, and an adhesive member 33.

The block 31 may include a seating portion 311 and a guide portion 312. The seating portion 311 may be formed flat, and may be seated into the recessed portion 25. The guide portion 312 may be bent rearward from the seating portion 311. The guide portion 312 may come into contact with one side of the recessed portion 25 forming a step difference with respect to the body 21, so as to guide the position of the seating portion 311 relative to the recessed portion 25.

The fixing portion 32 may be fixed to the block 31 and protrude to the rear of the fixing portion 32, and may face the hole 25a of the recessed portion 25. The fixing portion 32 may be a pem nut. In this case, a fastening member F, such as a screw, may be detachably fastened to the fixing portion 32 through the hole 25a. Accordingly, the block 31 may be coupled to or separated from the recessed portion 25. For example, a front surface of the fixing portion 32 may be disposed parallel to a front surface of the seating portion 311. As another example, the front surface of the fixing portion 32 may be positioned inside the seating portion 311.

The adhesive member 33 may be bonded to the front surface of the seating portion 311. For example, the adhesive member 33 may be a double-sided tape. Here, the block 31 and/or the adhesive member 33 may include an elastic material such as acrylic foam, urethane, or rubber. Accordingly, the block 31 and/or the adhesive member 33 may reduce impact transferred from the outside through the display panel 11 or the frame 20.

Figure 4:
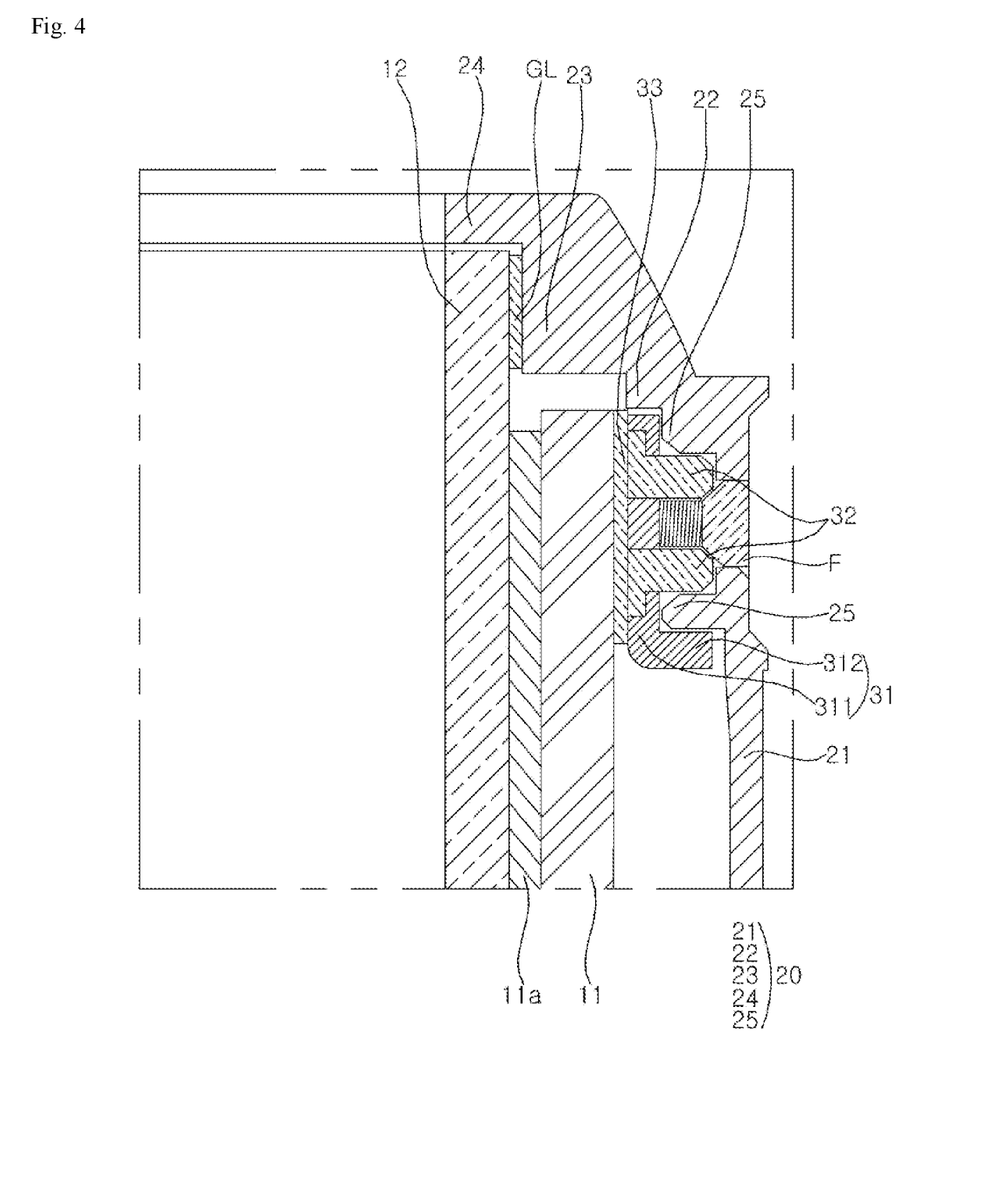
Figure 5:
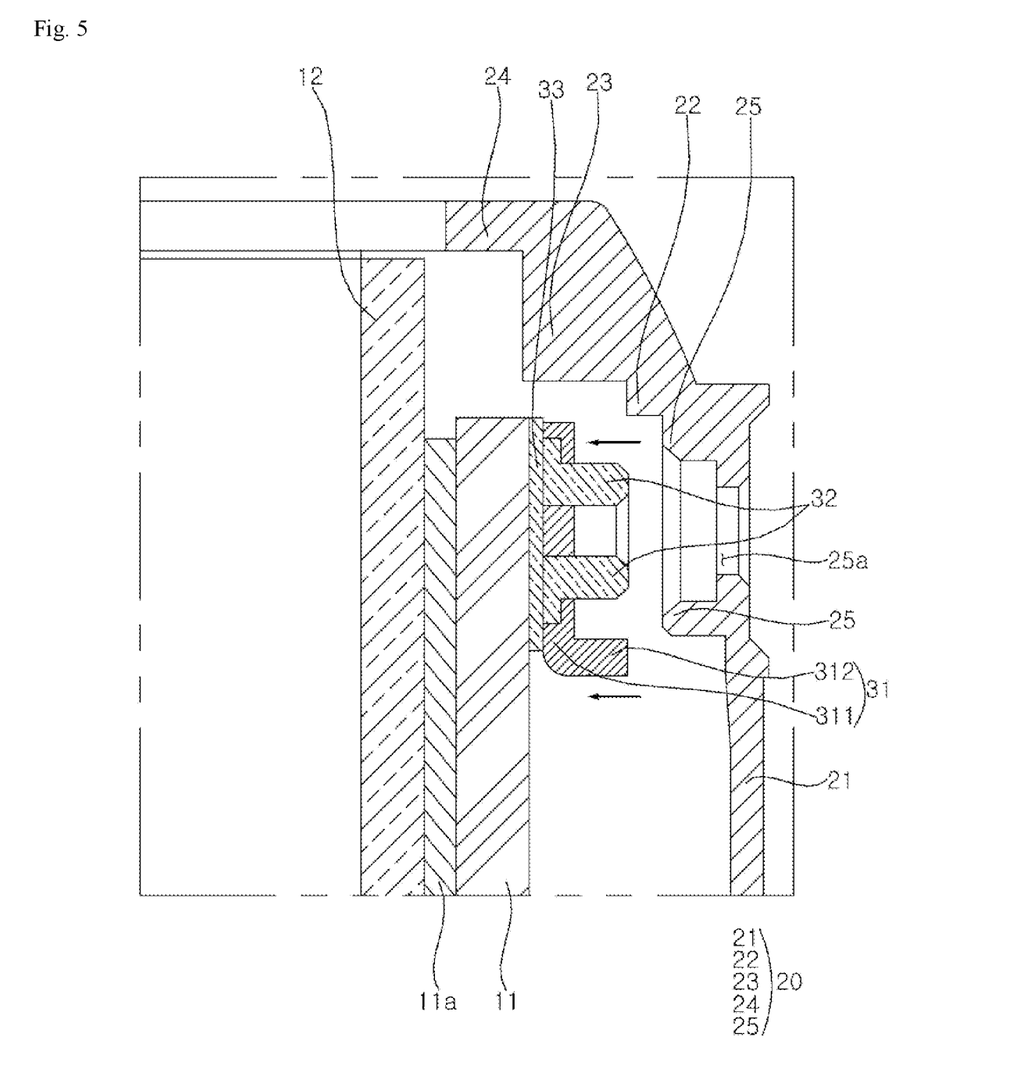

Referring to FIGS. 4 and 5, the display panel 11 and the transparent panel 12 may be coupled to each other, and may be detachably coupled to the frame 20.

Referring to FIG. 4, the block 31 may be coupled to the recessed portion 25 through the coupling of the fastening member F and the fixing portion 32. In addition, the adhesive member 33 may be disposed between the display panel 11 and the seating portion 311, so as to be coupled to the display panel 11 and the seating portion 311. Accordingly, the display panel 11 may be coupled to the frame 20.

Referring to FIG. 5, when the coupling of the fastening member F and the fixing portion 32 is released, the block 31 may be removed from the recessed portion 25 (see the arrow of FIG. 5). Here, the block 31 may remain coupled to the display panel 11 via the adhesive member 33.

Thus, when removing the display panel 11 from the frame 20, there is no need to separate the display panel 11 from the adhesive member 33 to thereby minimize panel breakage or damage.

Meanwhile, an adhesive GL (see FIG. 4) may be applied to the surface of the second part 23 so as to be bonded to the transparent panel 12. The adhesive GL may be glue.

Accordingly, coupling strength of the display panel 11 to the frame 20 may be increased. The adhesive member 33 may have a higher heat resistance than the adhesive GL. For example, the decomposition temperature of the adhesive member 33 may be about 200° C., and the decomposition temperature of the adhesive GL may be about 80° C.

When the disassembly of the display panel 11 from the frame 20 is required, the adhesive GL may be decomposed by raising the temperature of a portion adjacent to the second part 23 to about 80° C., thereby releasing the coupling of the fastening member F and the fixing portion 32.

Figure 6:
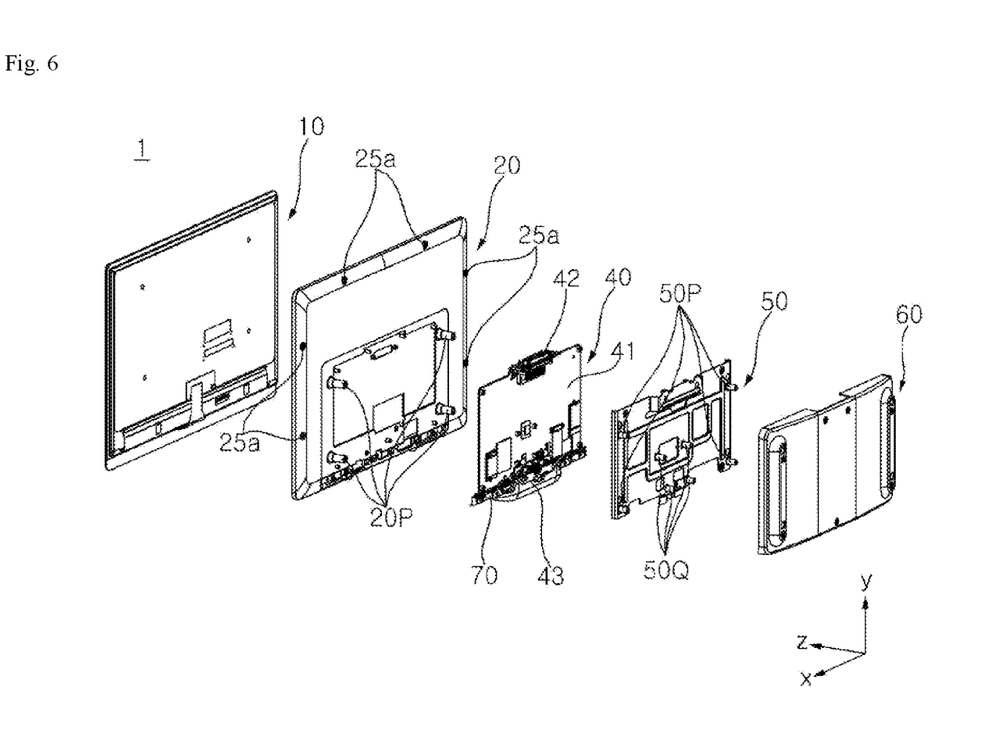

Referring to FIG. 6, a main board 40 may be coupled to the frame 20 at the rear of the frame 20. The main board 40 may include a substrate 41 and electronic components mounted on the substrate 41 to function in association with the operation of the display device 1. A connector 42 may be provided on an upper side of the substrate 41 so as to be connected to an external power line. An input unit 43 may be provided on a lower side of the substrate 41 so as to be electrically connected to an external terminal such as a USB, an earphone terminal, or the like.

A plate 50 may be coupled to the frame 20 and/or the main board 40 at the rear of the main board 40. The plate 50 may include a metal material such as aluminum (Al). In this case, heat generated from the main board 40 and the like may be easily transferred to the plate 50. Also, due to the plate 50, torsional rigidity and/or bending rigidity of the display device 1 may be increased. Meanwhile, the plate 50 may be referred to as a heat sink, a thermal plate, or a thermal cover.

A back cover 60 may be coupled to the frame 20, the main board 40, and/or the plate 50 at the rear of the plate 50. Here, a portion of the frame 20 may be covered by the back cover 60, and the remaining portion thereof may be exposed to the outside without being covered by the back cover 60. For example, the back cover 60 may include a plastic material or a metal material.

Figure 7:
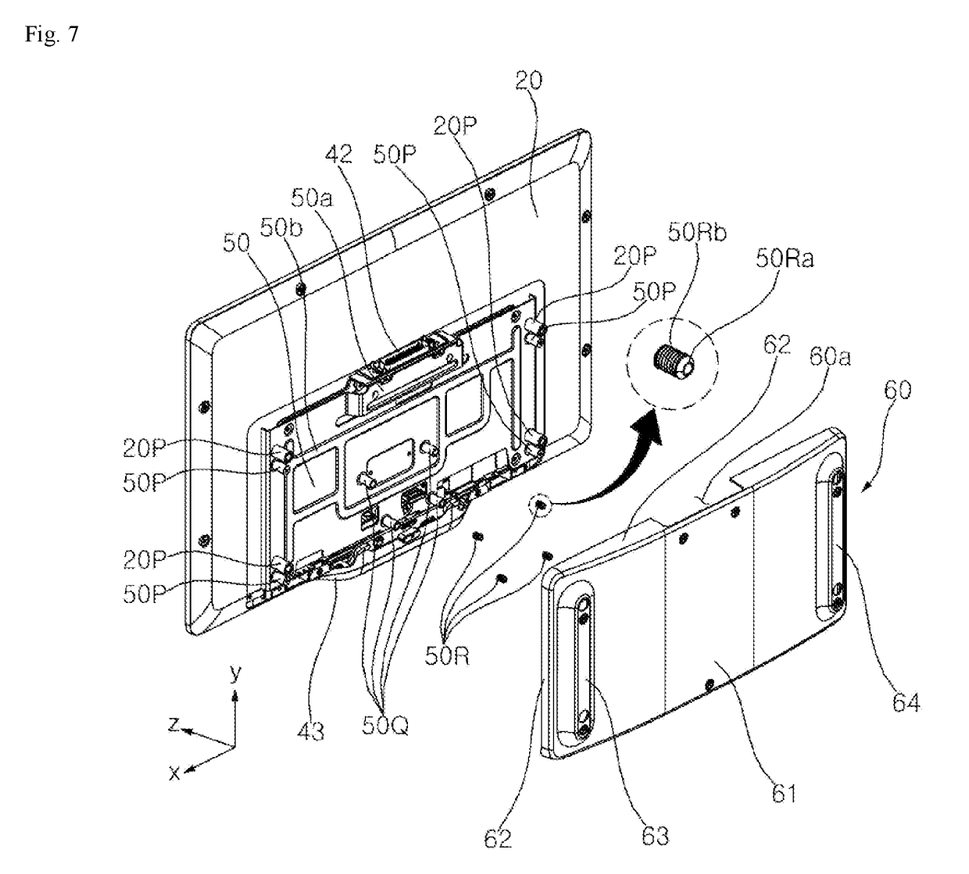

Referring to FIGS. 6 and 7, a rigid portion 50b may be formed by being pressed rearward from the plate 50. Due to the rigid portion 50b, torsional rigidity and/or bending rigidity of the display device 1 may be increased.

A first pem nut 20P may protrude rearward from a rear surface of the frame 20. For example, the first pem nut 20P may include a plurality of first pem nuts 20P spaced apart from each other along the perimeter of a portion of the frame 20 to which the main board 40 is coupled. Here, the plurality of first pem nuts 20P may pass through holes formed at corners of the main board 40.

A second pem nut 50P may protrude rearward from a rear surface of the plate 50. The second pem nut 50P may be provided in a region other than the rigid portion 50b of the plate 50. For example, the second pem nut 50P may include a plurality of second pem nuts 50P spaced apart from each other along the perimeter of the plate 50. Here, the plurality of second pem nuts 50P may be adjacent to the plurality of first pem nuts 20P passing through the holes of the main board 40.

The back cover 60 may include a rear cover 61, a side cover 62, a first protruding portion 63, and a second protruding portion 64. The rear cover 61 may cover the rear of the plate 50. The side cover 62 may protrude forward from an edge of the rear cover 61 so as to be in contact with the rear surface of the frame 20. A connector hole 60a may be formed in an upper surface of the side cover 62 so as to allow the connector 42 to be inserted therein. The first protruding portion 63 may be adjacent to a left side of the rear cover 61, and may be formed by being pressed rearward from the rear cover 61. The second protruding portion 64 may be adjacent to a right side of the rear cover 61, and may be formed by being pressed rearward from the rear cover 61.

In addition, the first pem nuts 20P and the second pem nuts 50P may be detachably coupled to the first protruding portion 63 and the second protruding 64 portion via a fastening member such as a screw. Accordingly, the frame 20, the main board 40, and the plate 50 may be coupled to the protruding portions 63 and 64 of the back cover 60. Consequently, the torsional rigidity and/or bending rigidity of the display device 1 may be further increased.

Figure 8:
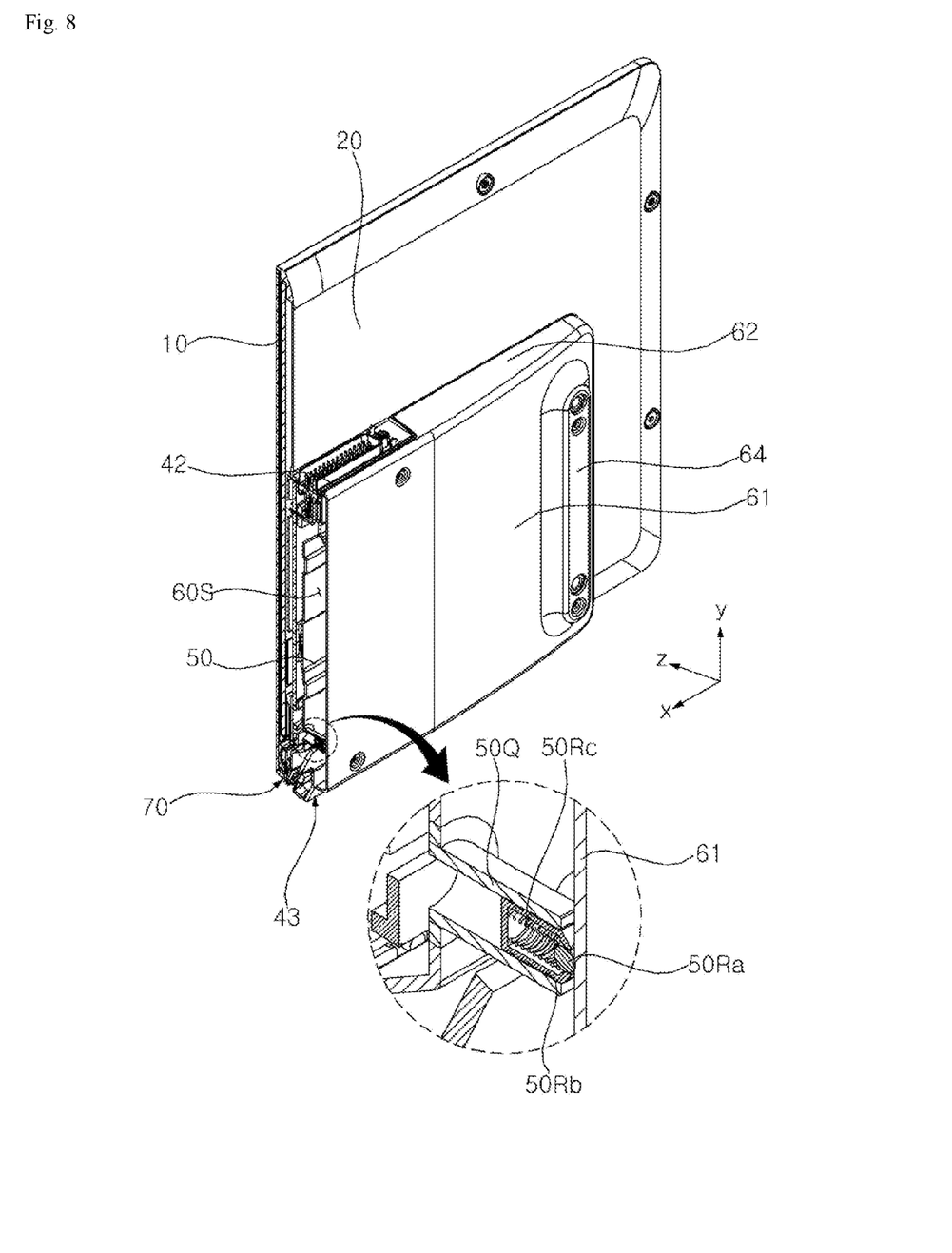

Referring to FIGS. 7 and 8, a supporter 50Q may protrude rearward from the rear surface of the plate 50. The supporter 50Q may be a pem nut. An end of the supporter 50Q may be spaced forward from a front surface of the rear cover 61. For example, the supporter 50Q may include a plurality of supporters 50Q spaced apart from each other.

A damper 50R may be disposed between the supporter 50Q and the back cover 60, and may be coupled to the supporter 50Q. A front end of the damper 50R may be fixed to the supporter 50Q, and a rear end of the damper 50R may be in contact with the front surface of the rear cover 61. The damper 50R may be configured to be stretched or compressed in a longitudinal direction thereof, namely, in the front-and-rear direction. For example, a plurality of dampers 50R may be coupled to the plurality of supporters 50Q, respectively. For example, the damper 50R may include a head 50Ra, a damper body 50Rb, and an elastic member 50Rc.

The head 50Ra may define the rear end of the damper 50R, and may be in contact with the front surface of the rear cover 61. The head 50Ra may be a ball or a roller.

At least a portion of the damper body 50Rb may be disposed inside the supporter 50Q. The damper body 50Rb may define the front end of the damper 50R, and may be fixed inside the supporter 50Q. For example, a screw thread may be formed on an outer circumferential surface of the damper body 50Rb, allowing the damper body 50Rb to be screwed to an inner circumferential surface of the supporter 50Q.

The elastic member 50Rc may be disposed in the damper body 50Rb, and the head 50Ra may be fixed to an end of the elastic member 50Rc. The elastic member 50Rc may be a spring.

Accordingly, the elastic member 50Rc may be stretched or compressed in the front-and-rear direction in response to the plate 50 being close to or away from the rear cover 61 by external force. In other words, the damper 50R may mitigate or absorb impact applied to the display device 1. That is, the damper 50R may minimize the formation of sharp edges due to damage to the display device 1 caused by external impact.

Meanwhile, a space 60S may be formed between the plate 50 and the back cover 60. The supporter 50Q may be spaced apart from the second pem nut 50P described above. For example, the second pem nut 50P may be adjacent to the corner of the plate 50, whereas the supporter 50Q may be adjacent to the center or lower side of the plate 50. Here, in an area between the second pem nut 50P and the supporter 50Q, the plate 50 may function as a leaf spring for absorbing external impact.

Meanwhile, the supporter 50Q and the damper 50R may be provided in a region other than the rigid portion 50b of the plate 50. This is more suitable for increasing the damping performance of the damper 50R relative to the front-rear depth of the space S, compared to the case where the supporter 50Q and the damper 50R are provided in a region of the rigid portion 50b of the plate 50.

Figure 9:
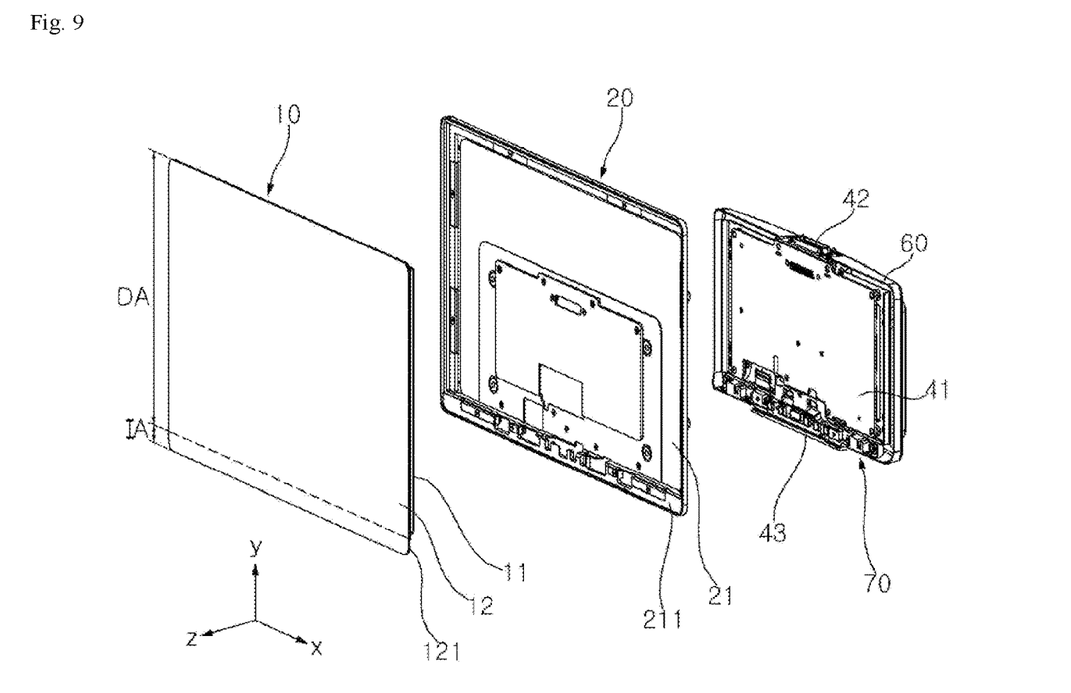

Referring to FIG. 9, the transparent panel 12 may be divided into a first area DA in which the image of the display panel 11 is displayed and a second area IA in which the image of the display panel 11 is not displayed. In the front-and-rear direction, the first area DA may overlap the display panel 11, and the second area IA may not overlap the display panel 11.

A lower part 211 may define the lower side of the frame 20, and may face a portion 121 defining the second area IA of the transparent panel 12. The lower part 211 may include holes (no reference numeral) through which light of an antenna assembly 70, which will be described below, passes. The lower part 211, excluding portions where the holes are formed, may be formed of an opaque material so as not to allow light to pass therethrough.

The antenna assembly 70 may be coupled to a lower side of the main board 40. The antenna assembly 70 may be electrically connected to the electronic components mounted on the main board 40.

Figure 10:
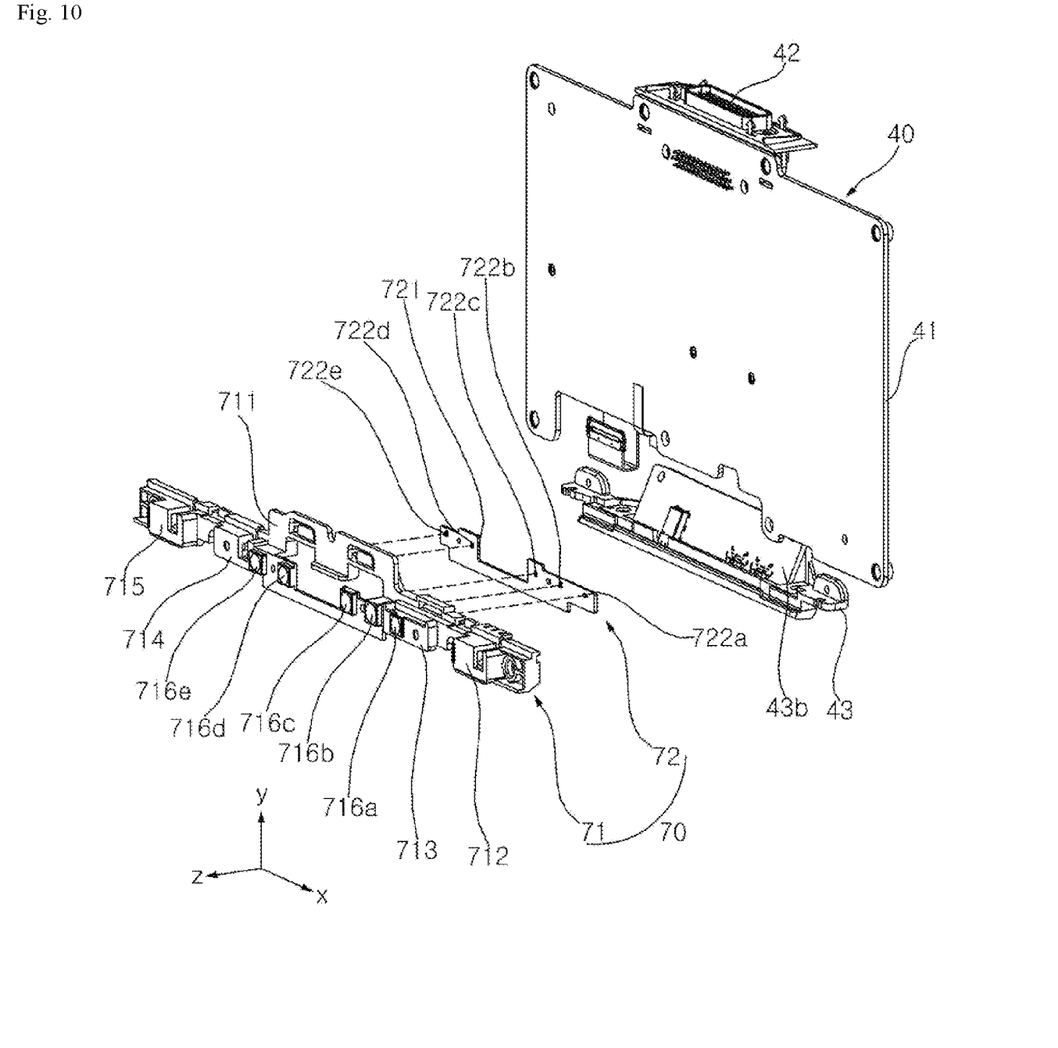

Referring to FIG. 10, the antenna assembly 70 may include a carrier assembly 71 and an optical assembly 72.

A body 711 of the carrier assembly 71 may be elongated in the left-and-right direction. For example, the carrier assembly 71 may include carriers 712, 713, 714, and 715 on which antennas are installed. A first carrier 712 may be adjacent to a left end of the body 711 and may be provided with an AUX antenna 81 (see FIG. 13). A second carrier 713 may be spaced rightward from the first carrier 712 and may be provided with an NFC antenna 82 (see FIG. 13). A third carrier 714 may be spaced rightward from the second carrier 713 and may be provided with a Bluetooth antenna 83 (see FIG. 13). A fourth carrier 715 may be adjacent to a right end of the body 711 and may be provided with a main antenna 84 (see FIG. 13).

In addition, lenses 716a, 716b, 716c, 716d, and 716e may be provided on a front surface of the body 711, and may be spaced apart from each other in the left-and-right direction. Meanwhile, the carrier assembly 71 may include a milky resin material to diffuse light.

A board 721 of the optical assembly 72 may be elongated in the left-and-right direction. The board 721 may be coupled to the body 711 at the rear of the body 711. For example, the optical assembly 72 may include light emitting devices 722a, 722b, 722c, 722d, and 722e that are provided on a front surface of the board 721 to provide light in a direction toward the carrier assembly 71, namely, forward. The light emitting devices 722a, 722b, 722c, 722d, and 722e may be spaced apart from each other in the left-and-right direction. The light emitting devices 722a, 722b, 722c, 722d, and 722e may be aligned with the respective lenses 716a, 716b, 716c, 716d, and 716e in the front-and-rear direction. For example, the light emitting device may be an LED element.

A first light emitting device 722a may be disposed behind a first lens 716a to provide light toward the first lens 716a. A second light emitting device 722b may be disposed behind a second lens 716*b* to provide light toward the second lens 716*b*. A third light emitting device 722*c* may be disposed behind a third lens 716*c* to provide light toward the third lens 716*c*. A fourth light emitting device 722*d* may be disposed behind a fourth lens 716*d* to provide light toward the fourth lens 716*d*. A fifth light emitting device 722*e* may be disposed behind a fifth lens 716*e* to provide light toward the fifth lens 716*e*.

Figure 11:
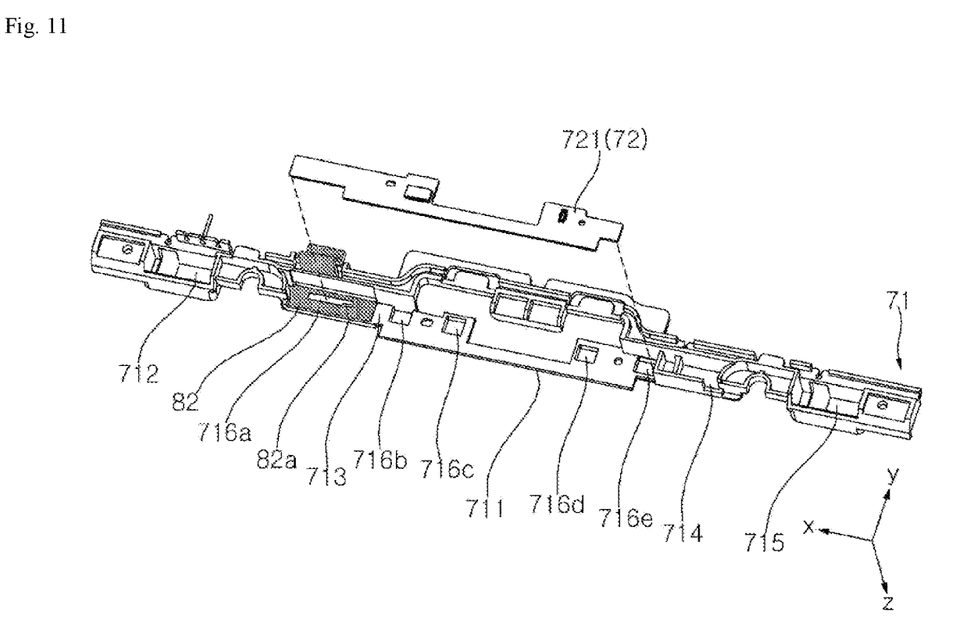
Figure 12:
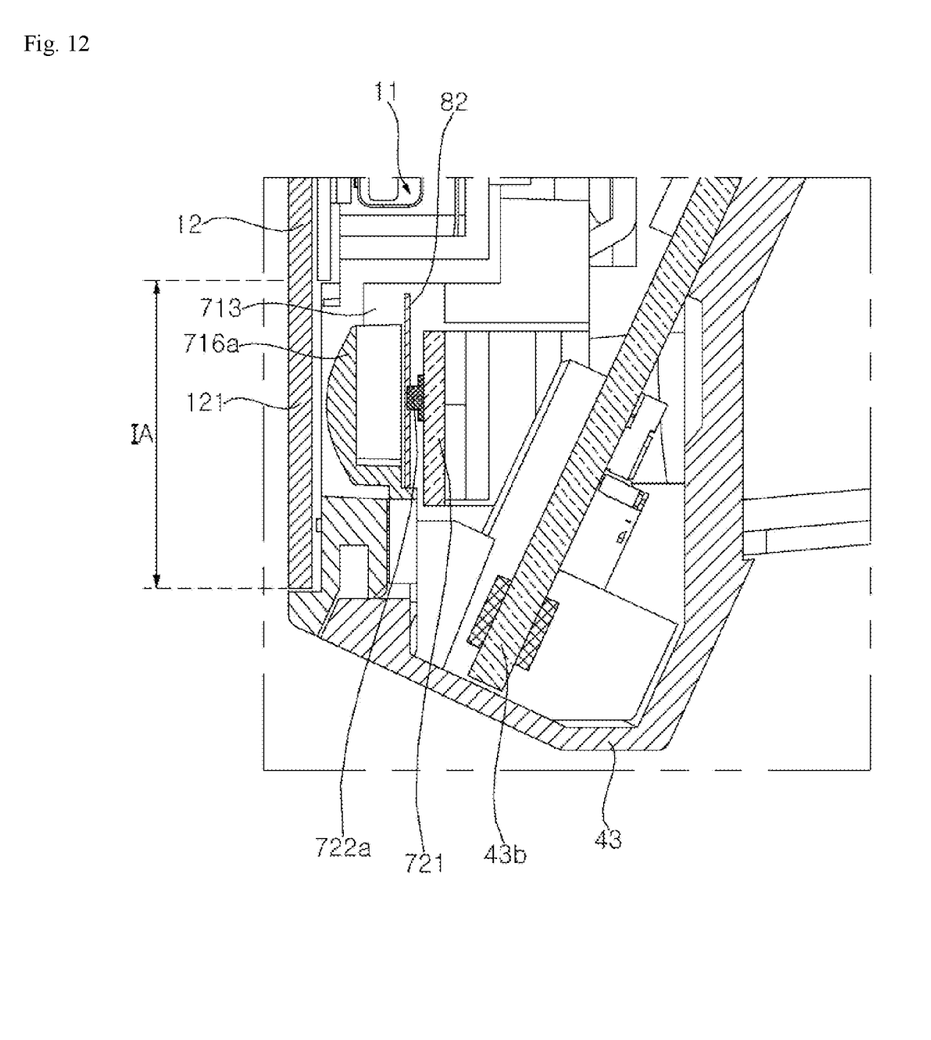

Referring to FIGS. 11 and 12, the NFC antenna 82 may be disposed between the second carrier 713 and the board 721. An antenna hole 82*a* may be formed through the NFC antenna 82 in the front-and-rear direction. The antenna hole 82*a* may be located forward relative to the first light emitting device 722*a*, and may have a width greater than the size of the first light emitting device 722*a*.

As the board 721 is located behind the NFC antenna 82, the NFC antenna 82 may smoothly receive radio waves in front of the antenna. In addition, light of the first light emitting device 722*a* may be provided to the first lens 716*a* through the antenna hole 82*a*.

Figure 13:
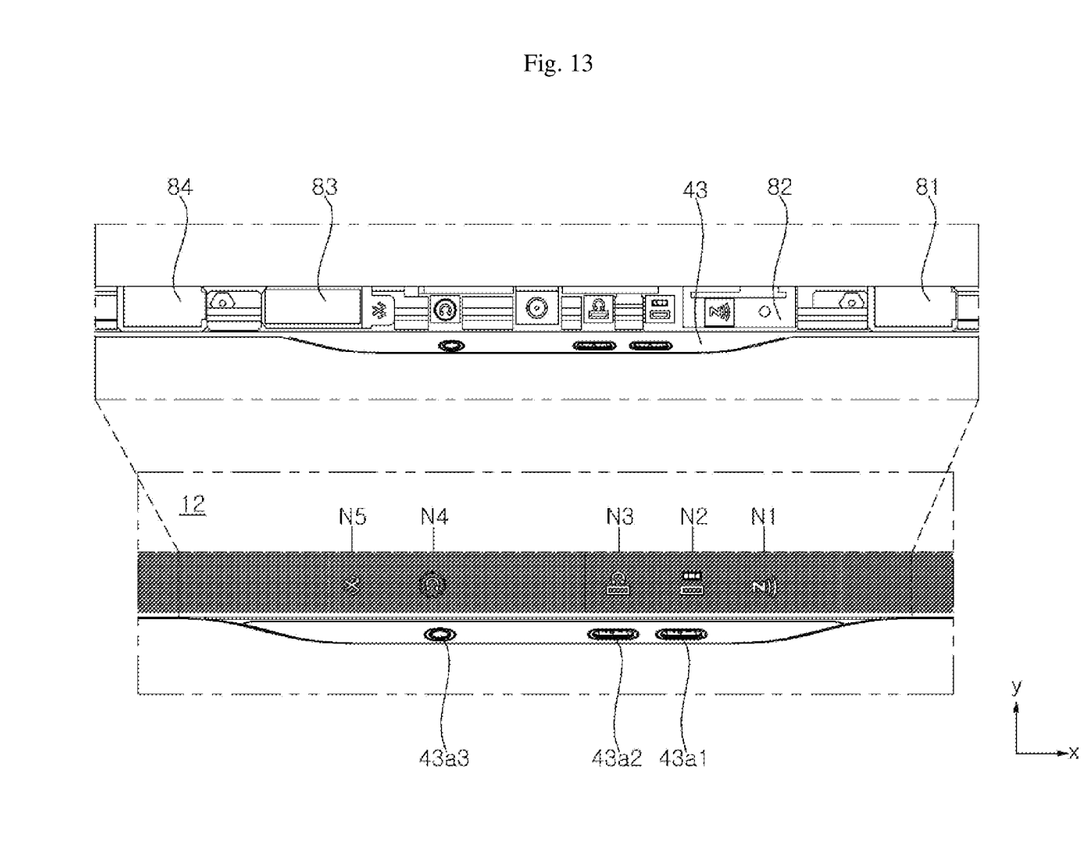

Referring to FIG. 13, the input unit 43 may include input ports 43*a*1, 43*a*2, and 43*a*3. A charging cable for charging an electronic device, such as a smart phone, may be connected to a first input port 43*a*1. A USB-C type earphone terminal may be connected to a second input port 43*a*2. A 3.5 mm jack type earphone terminal may be connected to a third input port 43*a*3.

Meanwhile, a portion corresponding to the second area IA (see FIG. 12) of the transparent panel 12 may be treated in black, but portions engraved with icons N1, N2, N3, N4, and N5 may be formed of a light transmitting material.

A first icon N1 may be formed on a portion of the transparent panel 12 that corresponds to the position of the NFC antenna 82, and may be aligned with the first lens 716*a*. A second icon N2 may be formed on a portion of the transparent panel 12 that corresponds to the position of the first input port 43*a*1, and may be aligned with the second lens 716*b*. A third icon N3 may be formed on a portion of the transparent panel 12 that corresponds to the position of the second input port 43*a*2, and may be aligned with the third lens 716*c*. A fourth icon N4 may be formed on a portion of the transparent panel 12 that corresponds to the position of the third input port 43*a*3, and may be aligned with the fourth lens 716*d*. A fifth icon N5 may be formed on a portion of the transparent panel 12 that corresponds to the position of the Bluetooth antenna 83, and may be aligned with the fifth lens 716*e*.

A controller (not shown) may be electrically connected to each of the components of the display device 1, thereby controlling the operation of the display device 1.

When the reception of radio waves from the NFC antenna 82 is required, the controller may control the first light emitting device 722*a* so that light is provided from the first light emitting device 722*a* through the first lens 716*a* to the first icon N1.

In response to an external terminal being connected to the first input port 43*a*1, the controller may control the second light emitting device 722*b* so that light is provided from the second light emitting device 722*b* through the second lens 716*b* to the second icon N2.

In response to an external terminal being connected to the second input port 43*a*2, the controller may control the third light emitting device 722*c* so that light is provided from the third light emitting device 722*c* through the third lens 716*c* to the third icon N3.

In response to an external terminal being connected to the third input port 43*a*3, the controller may control the fourth light emitting device 722*d* so that light is provided from the fourth light emitting device 722*d* through the fourth lens 716*d* to the fourth icon N4.

When the reception of radio waves from the Bluetooth antenna 83 is required, the controller may control the fifth light emitting device 722*e* so that light is provided from the fifth light emitting device 722*e* through the fifth lens 716*e* to the fifth icon N5.

According to an aspect of the present disclosure, a display device includes: a display panel; a frame located rearward relative to the display panel; a plate coupled to the frame at a rear of the frame; and a back cover to cover a rear of the plate, wherein the plate includes a damper that is disposed between the plate and the back cover and is configured to be stretched or compressed in a front-and-rear direction.

According to another aspect of the present disclosure, a space may be formed between the plate and the back cover. The damper may have a front end that is fixed to the plate and a rear end that is in contact with an inner surface of the back cover.

According to another aspect of the present disclosure, the damper may include: an elastic member elongated in a front-and-rear direction, the elastic member being configured to be stretched or compressed in a longitudinal direction thereof; and a head fixed to an end of the elastic member, the head being in contact with the inner surface of the back cover.

According to another aspect of the present disclosure, the elastic member may be a spring.

According to another aspect of the present disclosure, the head may be a ball or a roller.

According to another aspect of the present disclosure, the plate may further include a supporter that protrudes from the plate toward the back cover. The damper may further include a damper body that defines an inner space in which the elastic member is installed and is fixed to one side of the supporter.

According to another aspect of the present disclosure, a screw thread may be formed on an outer circumferential surface of the damper body. The damper body may be screwed to an inside of the supporter.

According to another aspect of the present disclosure, the plate may further include a rigid portion formed by being pressed rearward from the plate.

According to another aspect of the present disclosure, the damper may be provided in a region other than the rigid portion of the plate.

According to another aspect of the present disclosure, the frame may include a first pem nut that protrudes from the frame toward the plate so as to pass through the plate. The plate may further include a second pem nut that protrudes from the plate toward the back cover and is adjacent to the first pem nut. The first pem nut and the second pem nut may be coupled to the back cover.

According to another aspect of the present disclosure, the back cover may include a protruding portion that is formed by being pressed rearward from the back cover and to which the first pem nut and the second pem nut are coupled.

According to another aspect of the present disclosure, the second pem nut may be spaced apart from the damper. The plate may be spaced forward from the back cover in an area between the second pem nut and the damper.

According to another aspect of the present disclosure, the plate may contain a metal material.

According to another aspect of the present disclosure, the display device may further include a coupling part that is disposed between the display panel and the frame and has elasticity.

According to another aspect of the present disclosure, the coupling part may be fixed to the display panel and may be detachably coupled to the frame.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings, and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a display panel;
a frame located rearward relative to the display panel;
a plate coupled to the frame at a rear of the frame; and
a back cover to cover a rear of the plate,
wherein the plate comprises a damper that is disposed between the plate and the back cover and is configured to be stretched or compressed in a front-and-rear direction,
wherein the frame comprises a first pem nut that protrudes from the frame toward the plate so as to pass through the plate,
wherein the plate further comprises a second pem nut that protrudes from the plate toward the back cover and is adjacent to the first pem nut, and
wherein the first pem nut and the second pem nut are coupled to the back cover.

2. The display device of claim 1, wherein a space is formed between the plate and the back cover, and
wherein the damper has a front end that is fixed to the plate and a rear end that is in contact with an inner surface of the back cover.

3. The display device of claim 2, wherein the damper comprises:
an elastic member elongated in a front-and-rear direction, the elastic member being configured to be stretched or compressed in a longitudinal direction thereof; and
a head fixed to an end of the elastic member, the head being in contact with the inner surface of the back cover.

4. The display device of claim 3, wherein the elastic member is a spring.

5. The display device of claim 3, wherein the head is a ball or a roller.

6. The display device of claim 3, wherein the plate further comprises a supporter that protrudes from the plate toward the back cover, and
wherein the damper further comprises a damper body that defines an inner space in which the elastic member is installed and is fixed to one side of the supporter.

7. The display device of claim 6, wherein a screw thread is formed on an outer circumferential surface of the damper body, and
wherein the damper body is screwed to an inside of the supporter.

8. The display device of claim 1, wherein the plate further comprises a rigid portion formed by being pressed rearward from the plate.

9. The display device of claim 8, wherein the damper is provided in a region other than the rigid portion of the plate.

10. The display device of claim 1, wherein the back cover comprises a protruding portion that is formed by being pressed rearward from the back cover and to which the first pem nut and the second pem nut are coupled.

11. The display device of claim 1, wherein the second pem nut is spaced apart from the damper, and
wherein the plate is spaced forward from the back cover in an area between the second pem nut and the damper.

12. The display device of claim 1, wherein the plate includes a metal material.

13. The display device of claim 1, further comprising a coupling part disposed between the display panel and the frame, the coupling part having elasticity.

14. The display device of claim 13, wherein the coupling part is fixed to the display panel and is detachably coupled to the frame.

* * * * *